(12) United States Patent
Rambo et al.

(10) Patent No.: US 8,299,979 B2
(45) Date of Patent: Oct. 30, 2012

(54) INTEGRAL EYE-PATH ALIGNMENT ON TELEPHONY AND COMPUTER VIDEO DEVICES USING TWO OR MORE IMAGE SENSING DEVICES

(75) Inventors: Darwin Rambo, Surrey (CA); Philip Houghton, Surrey (CA)

(73) Assignee: Broadcom Corporation, Irvine, CA (US)

( * ) Notice: Subject to any disclaimer, the term of this patent is extended or adjusted under 35 U.S.C. 154(b) by 1710 days.

(21) Appl. No.: 10/438,237

(22) Filed: May 14, 2003

(65) Prior Publication Data
US 2004/0227693 A1 Nov. 18, 2004

(51) Int. Cl.
G09G 5/00 (2006.01)
G06F 17/00 (2006.01)
G06T 1/00 (2006.01)
H04N 7/14 (2006.01)

(52) U.S. Cl. .......... 345/1.2; 345/1.1; 345/418; 345/649; 348/14.09; 348/14.12

(58) Field of Classification Search .................... 345/1.1, 345/1.2, 418–427, 606, 607, 649–659; 348/14.08–14.1, 14.12–14.16, 14.01
See application file for complete search history.

(56) References Cited

U.S. PATENT DOCUMENTS

| 4,400,725 | A | | 8/1983 | Tanigaki |
| 5,159,445 | A | | 10/1992 | Gitlin et al. |
| 5,359,362 | A | * | 10/1994 | Lewis et al. ................... 348/14.1 |
| 5,394,198 | A | | 2/1995 | Janow |
| 5,500,671 | A | * | 3/1996 | Andersson et al. .......... 348/14.1 |
| 5,751,337 | A | | 5/1998 | Allen et al. |
| 5,815,197 | A | * | 9/1998 | Kakii ......................... 348/14.16 |
| 5,986,703 | A | * | 11/1999 | O'Mahony ............... 348/333.12 |
| 6,259,470 | B1 | * | 7/2001 | Koizumi et al. ............. 348/14.1 |
| 6,466,250 | B1 | * | 10/2002 | Hein et al. .................. 348/14.16 |
| 6,687,418 | B1 | | 2/2004 | Ludwig |
| 6,724,417 | B1 | * | 4/2004 | Hillis et al. ................. 348/14.16 |
| 6,888,562 | B2 | | 5/2005 | Rambo et al. |
| 7,023,464 | B1 | * | 4/2006 | Harada et al. .............. 348/14.01 |
| 7,136,818 | B1 | * | 11/2006 | Cosatto et al. ................. 704/275 |
| 2003/0218672 | A1 | * | 11/2003 | Zhang et al. ............... 348/14.16 |
| 2004/0130614 | A1 | * | 7/2004 | Valliath et al. ............. 348/14.01 |
| 2005/0162510 | A1 | | 7/2005 | Rambo et al. |

FOREIGN PATENT DOCUMENTS

| JP | 10070713 A | 3/1998 |
| JP | 2000059748 A | 2/2000 |
| JP | 2001231019 A | 8/2001 |

OTHER PUBLICATIONS

Zitnick, Lawrence; Gemmell, Jim; Toyama, Kentaro. "Manipulation of Video Eye Gaze and Head Orientation for Video Teleconferencing". Jun. 16, 1999. Microsoft Research. Technical Report MSR-TR-99-46. pp. 3-4.*

* cited by examiner

Primary Examiner — Srilakshmi K Kumar
(74) Attorney, Agent, or Firm — Thomas, Kayden, Horstemeyer & Risley, LLP

(57) ABSTRACT

A two-way visual communication system using multiple imaging devices, and a method for operating such a device is described. An embodiment of the present invention may use an image processor to analyze and modify image data from one or more imaging devices, and from the far-end party, in order to improve the perceived level of eye contact experienced by the users. The output signals from the imaging devices may be individually selected for transmission to the far end party, or may be used in combination in the synthesis of a composite image, using information derived from the imaging devices and/or from the image of the far-end party.

31 Claims, 6 Drawing Sheets

INTEGRAL EYE-PATH ALIGNMENT ON TELEPHONY AND COMPUTER VIDEO DEVICES USING TWO OR MORE IMAGE SENSING DEVICES

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In general, interpersonal two-way visual communications devices have failed to meet the public acceptance that was expected of them following their introduction. One of the factors that may hinder usage growth is an unnatural component of the user interface of a typical two-way visual communication device. In normal face-to-face conversation, eye contact is considered to be both polite and desirable, and the avoidance of eye contact may be taken as an indication of evasiveness or deception. Because the imaging device in a typical two-way visual communication system is located outside of the viewing area of the local visual display, users making eye contact with the image of the far-end party are actually perceived by the far-end party as avoiding eye contact. The near-end party must overcome the natural tendency to look at the image of the other party, and look almost directly into their own imaging device to be perceived by the far-end party as making eye contact. To view the far-end party, however, they must look away from their own imaging device and look at the visual display showing the image of the far-end party. This forces the user to make the uncomfortable choice to either look at the displayed image of the far-end party and lose eye contact, or make eye contact by looking at the imaging device and not view the distant party. The result is an awkward interaction for those at both ends of the call.

The importance of direct eye contact in visual communication prompted the development of a solution for use by television broadcast news on-air personalities. The teleprompter was invented to permit a news announcer to focus his/her view directly into the lens of a television camera while reading news text. To allow the announcer to read the news, an optical arrangement within the teleprompter passes the image of the news announcer to a television camera, while at the same time displaying to the news announcer an image of the text to be read. The result is that the announcer can view the image of the material to be read, while seeming to keep their eyes focused on the television camera. It works satisfactorily in the broadcast studio, but is a bulky and ill-suited solution for interpersonal communication use on a desktop or in connection with other personal computer type applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the disclosed invention relate in general to the broad subject matter of two-way visual communication systems. More specifically, certain embodiments of the invention relate to two-way visual communication systems using multiple imaging devices in order to improve the perception of eye contact.

Aspects of the present invention may be seen in a two-way visual communication system comprising a visual display device for displaying an image represented by a first signal, and an imaging device having a field of view directed at a user of the visual display device. The imaging device may produce a second signal, and the at least one image processor may modify at least one of the first signal and the second signal. The modifying may comprise altering the second signal in order to change the apparent viewpoint of the imaging device, and may be based upon the first signal. The first signal may be altered so as to align a feature of the displayed image in specific relation to the apparent position of the imaging device. In addition, the modifying may comprise altering the second signal in order to increase the perception of eye contact by a viewer of the image represented by the second signal. An embodiment in accordance with the present invention may further comprise an interface for communicating via a network, where the network may be a packet network and/or a wireless network.

Another aspect of the present invention may be observed in a two-way visual communication system comprising a visual display device for displaying an image represented by a first signal, at least two imaging devices in spaced relation to one another, and at least one image processor. The at least two imaging devices may be arranged so that the fields of view of the at least two imaging devices are directed at a user of the visual display device. Each of the at least two imaging devices may produce an output signal, and the output signals may collectively form a plurality of output signals. The at least one image processor may process at least one of the first signal and the plurality of output signals, and may produce a second signal. The two-way visual communication system may further comprise an interface for communicating via a network, where the network is one of at least a packet network and a wireless network.

The second signal in an embodiment of the present invention may represent an image synthesized using at least two of the plurality of output signals. The resolution of the image represented by the second signal may be greater than the resolution of the image represented by any one of the plurality of output signals. In addition, the number of picture elements in the image represented by the second signal may be greater than the number of picture elements in the image represented by any one of the plurality of output signals. The level of eye contact with a user as perceived by a viewer of the image represented by the second signal may also be improved relative to the level of eye contact perceived by a viewer of the image represented by any one of the plurality of output signals. The processing of the plurality of output signals may depend upon the first signal, and the first signal may be altered in order to position a portion of the image represented by the first signal in specific relation to at least one of the at least two imaging devices. The processing in an embodiment of the present invention may select at least one of the plurality of output signals based upon the proximity of the corresponding imaging device to at least one portion of the image represented by the second signal.

Another aspect of the present invention may be seen in a method of operating a two-way visual communication system. Such a method may comprise receiving a first signal representing a first image, processing the first signal to identify at least one characteristic of the first image, and converting a second image to a second signal. In addition, the method may comprise analyzing the second signal to identify at least one characteristic of the second image, and modifying the second signal based upon at least one of the at least one characteristic of the first image and the at least one characteristic of the second image. The method may also include transmitting the second signal via a network, where the network may be a packet network and/or a wireless network.

Yet other aspects of the present invention may be seen in another method of operating a two-way visual communication system. The method may comprise receiving a first signal representing a first image, processing the first signal to identify at least one characteristic of the first image, and converting a plurality of images into a plurality of output signals. In addition, the method may comprise analyzing the plurality of output signals to identify at least one characteristic of the plurality of images. The method may include combining the plurality of output signals into a second signal based upon at least one of the at least one characteristic of the first image and the at least one characteristic of the plurality of images. The at least one characteristic of the plurality of output images may be the direction of gaze and/or the orientation of the head of a person. The processing may alter the first signal based upon the at least one characteristic of the first image, and the method may also comprise displaying the altered first signal, and transmitting the second signal via a network. The network may be a packet network and/or a wireless network.

Yet another aspect of the present invention may be observed in a machine-readable storage, having stored thereon a computer program having a plurality of code sections for implementing a two-way visual communication system, the code sections executable by a machine for causing the machine to perform the foregoing.

These and other advantages, aspects, and novel features of the present invention, as well as details of illustrated embodiments, thereof, will be more fully understood from the following description and drawings.

DETAILED DESCRIPTION OF THE INVENTION

Figure 1:
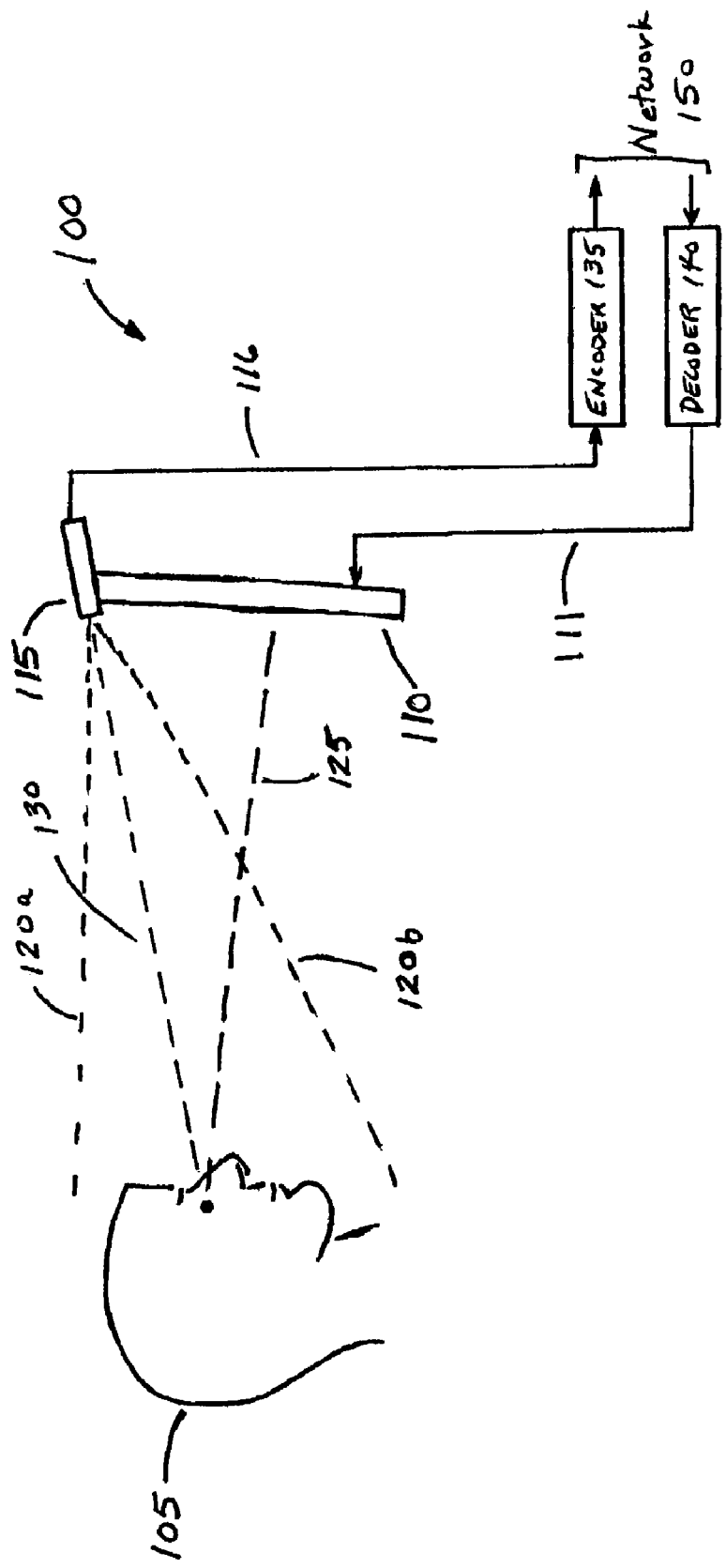
FIG. 1 is a block diagram of an exemplary two-way visual communication system using a single imaging device.

FIG. 1 shows a side-view of a user engaged in a communication session using an exemplary two-way visual communication system 100. The two-way visual communication system 100 comprises a visual display device 110, an imaging device 115, an encoder 135, and a decoder 140. The signal 116 representing the image of the near-end user 105 from the imaging device 115 is encoded by the encoder 135 for transmission via the network 150. The decoder 140 decodes the image data received from the network 150, converting it to a signal 111 suitable for display on the visual display device 110. In the illustration of FIG. 1, the near-end user 105 is positioned to view the active area of the visual display device 110. Typical of many existing workstation video conferencing arrangements, the imaging device 115 of FIG. 1 is shown positioned above the visual display device 110, and the field of view of the imaging device 115 with upper and lower limits 120a and 120b is trained on the near-end user 105. The vector 125 represents the line of sight of the near-end user 105 that typically exists as the near-end user 105 attempts to makes eye contact with the image of a far-end user displayed on the visual display device 110. As can be seen in the illustration of FIG. 1, the fact that the eyes of the near-end user 105 are focused on an image on the visual display device 110 via the line of sight vector 125 rather than on the imaging device 115 via viewing vector 130 causes the image output by the imaging device 115 to show the eyes of the near-end user 105 cast downward. This discrepancy causes the far-end user to perceive a lack of eye contact with the near-end user 105, typically creating a sense of discomfort within the far-end user. In general, the greater the discrepancy between the line of sight vector 125 of near-end user 105 and the position of the imaging device 115, the less likely that eye contact is perceived by the far-end user.

Figure 2:
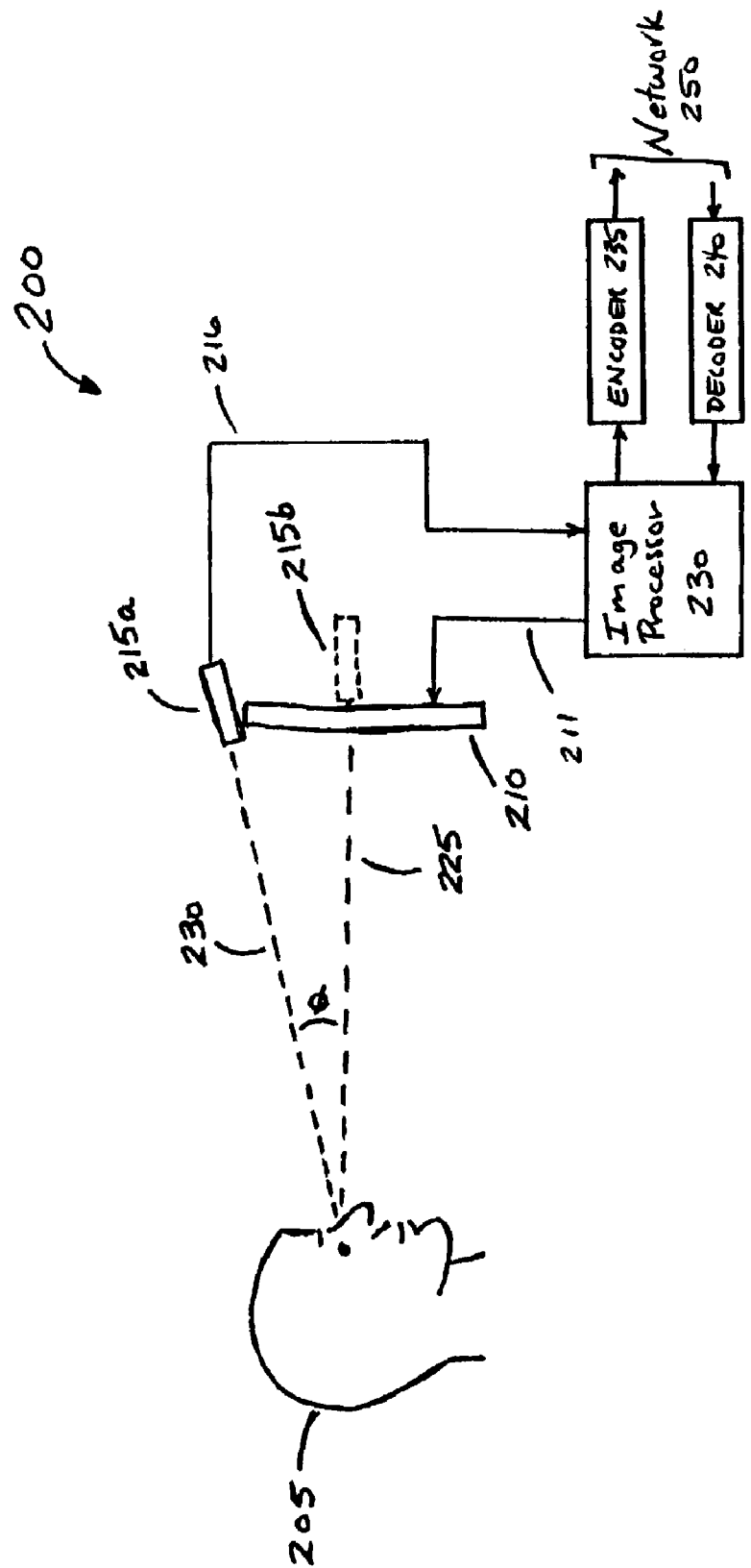
FIG. 2 shows a side-view of a user engaged in a communication session using an exemplary embodiment of a two-way visual communication system, in accordance with the present invention.

FIG. 2 shows a side-view of a user engaged in a communication session using an exemplary embodiment of a two-way visual communication system 200, in accordance with the present invention. The two-way visual display system 200 comprises a visual display device 210, an imaging device 215a, an image processor 230, an encoder 235, and a decoder 240. The signal 216 representing the image of the near-end user 205 from the imaging device 215a is processed by the image processor 230, and the resulting image information is encoded by the encoder 235 for transmission via the network 250. The decoder 240 decodes the image data received from the network 250 and passes it to the image processor 230 for processing. The signal 211 output by image processor 230 is then displayed on the visual display device 210. Visual display device 210 may be, for example, a conventional cathode ray tube (CRT), a liquid crystal display (LCD), or a plasma display. Although the imaging device 215a is shown in FIG. 2 is positioned above the visual display device 210, the present invention is not limited in this respect, and the imaging device 215a may be located at another point near or even within the active (viewing) area of visual display device 210.

In one embodiment in accordance with the present invention, the image from imaging device 215a may be analyzed by image processor 230 to determine the orientation of the head and the boundary of the face of near-end user 205, and to locate within the image that portion of the image containing the eyes of near-end user 205. Algorithms to calculate an estimate of head orientation and the position within an image of facial features such as the eyes are well known in the art. An exemplary approach to the estimation of head orientation or "pose" can be found in the work of S. McKenna and S. Gong, "Real-time face pose estimation", International Journal on Real Time Imaging—Special Issue on Real-time Visual Monitoring and Inspection, Vol. 4, pp. 333-347, 1998. An exemplary approach to the identification of facial features within an image may be found in the work of R. S. Feris, J. Gemmell, K. Toyama, and V. Krueger, "Hierarchical Wavelet Networks for Facial Feature Localization", Technical Report MSR-TR-2002-05, Microsoft Research, Microsoft Corporation, Jan. 9, 2002. In addition, algorithms to estimate pose may use information derived from images of the head of near-end user 205 captured during a system training activity in a predetermined range of head orientations or "poses". Upon determining the orientation of the head within the image from imaging device 215a, the image processor 230 may perform the required transformations to re-orient the image to create the appearance that the near-end user is focused directly at imaging device 215a. In one embodiment, this may be accomplished by rotating the image of the head of user 205 from imaging device 215a as though the imaging device 215a had been moved to the position shown as 215b. The sub-image containing the eyes may then be identified, and the appearance of the eyes modified to produce a further improvement in the level of eye contact as perceived by the far-end user.

The modification of the sub-image of the image from imaging device 215a containing the eyes of near-end user 205 may be arranged to cause the overall image intended for transmission to conform with a set of rules derived from the images of a representative sample of test subjects using a predetermined range of head orientations relative to the imaging device 215a. The modification may also attempt to match a sub-image of the eyes of near-end user 205 captured during a system training activity in which the head of near-end user 205 was in approximately the same head orientation. The image modification algorithm used by image processor 230 may include factors such as, for example, the estimate of head orientation derived from the image of imaging device 215a, measurements of the visible portions of the sclera and the relationships between this measurement for each eye, the size and symmetry of the visible portion of the iris of each eye, and the position of the eyelid relative to fixed facial features such as, for example, the nose. By identifying the position of the head of the user 205, and by further identifying the eyes as features within the image from imaging device 215a, the direction of gaze of the eyes of user 205 can be adjusted within a modified version of the image from the imaging device 215a. In addition, an embodiment of the present invention may permit the near-end user to make adjustments in the transformation of the near-end image in a closed-loop fashion. In this manner, the near-end user may be permitted to view the image to be transmitted to the far-end party by two-way visual communication system 200 and optimize the appearance. An embodiment in accordance with the present invention may also allow the user to disable the modification of the image from imaging device 215a, when conditions warrant it. Using one or more of the above described approaches, an embodiment of the present invention makes the user 205 appear to maintain a greater degree of eye contact with the far-end party than would otherwise be perceived from an unmodified image of the user 205.

As described above, an embodiment in accordance with the present invention may be trained by a user so that the system has a set of image samples for the facial features of the near-end user 205. Users of other electronic communication equipment are familiar with the use of training sequences in configuring a piece of computer or communications equipment before use. For example, users of speakerphones may activate a training mode designed to compensate for the acoustics of a room. Users of text-to-speech systems generally recite a predefined vocabulary of training words to enable the system to recognize phonemic elements of their speech. In the case of an embodiment of the present invention, the users may be asked to position themselves to view the visual display and to focus their eyes on an icon placed at a series of locations about the screen. As the icon is displayed at each screen location, an image of the user focusing on that area of the screen is captured. The resulting library of images of different head orientations and direction of gaze may be used, for example, as a set of templates to determine the position of the head of the user and/or as image source material with which to synthesize a particular image for transmission to the far-end party.

In yet another embodiment of the present invention, an image received from the far-end party may be modified by image processor 230 so as to minimize the distance between the eyes of the far-end party within the displayed image on visual display device 210, and the imaging device 215a trained on the near-end user 205. Using this approach, the image processor 230 may continuously analyze the image of the far-end party received via network 250 in order to determine on a real-time basis the location of the face portion, and in particular, the position of the eyes within the image of the far-end party. Using this information, the image processor may then produce a modified form of the image of the near-end user 205 for display on the visual display device of the far-end user. The modified image may be constructed so as to maintain the shortest possible distance between the aperture of the near-end imaging device 215a and the image of the eyes of the far-end party displayed on the near-end visual display device 210. The modification of the image from imaging device 215a may also include, for example, rotating the image and altering the appearance of the eyes, as described above. By analyzing the content of the far-end image and using that information in the modification of the near-end image, the eyes in the image of the near-end user 205 transmitted by an embodiment of the present invention will follow the eyes of the far-end user. This results in a greater perceived level of eye contact for the far-end party.

Figure 3A:
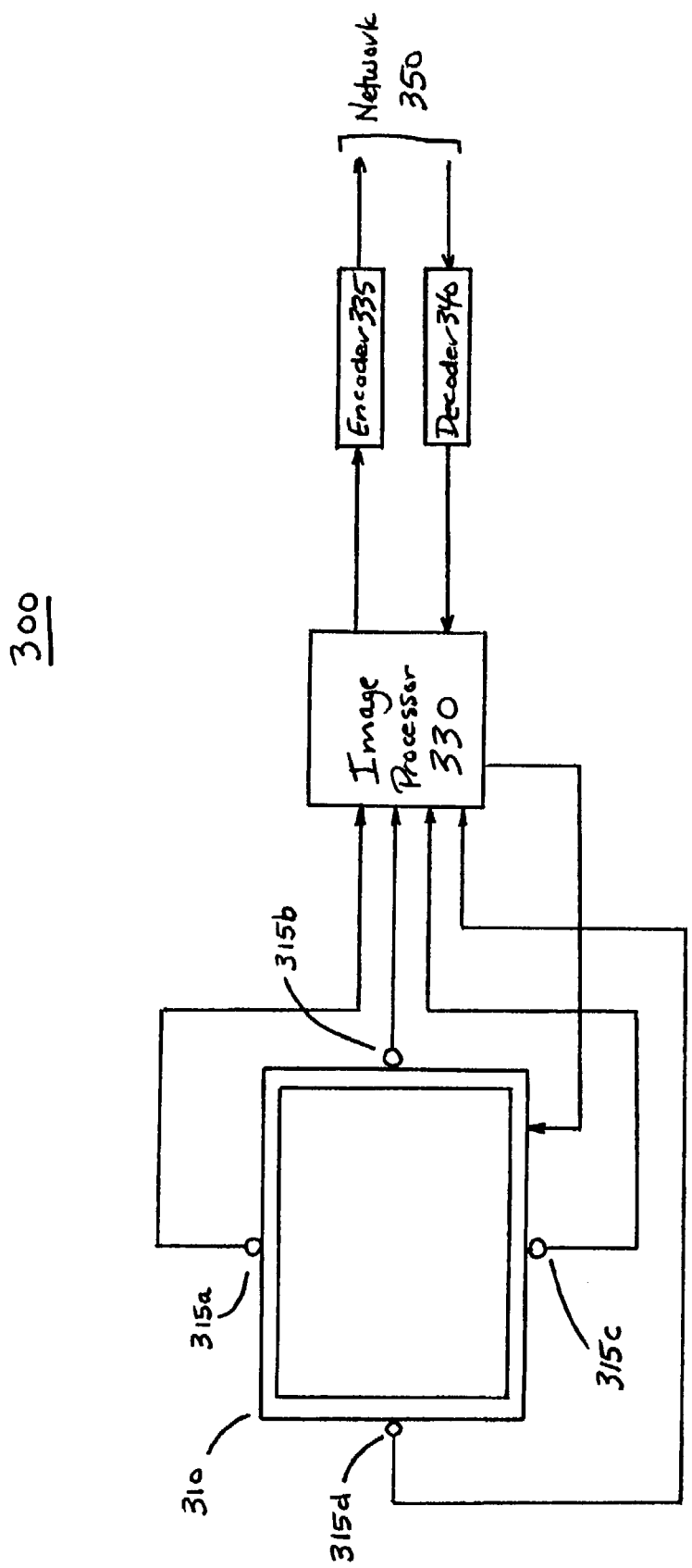
FIG. 3A shows an exemplary embodiment of a two-way visual communication system in which multiple imaging devices are positioned in close proximity to a visual display device, in accordance with the present invention.

FIG. 3A shows an exemplary embodiment of a two-way visual communication system 300 in which multiple imaging devices are positioned in close proximity to a visual display device 310, in accordance with the present invention. In the exemplary embodiment of FIG. 3A, the two-way visual communication system 300 comprises a visual display device 310 (the front of which is illustrated), imaging devices 315a, 315b, 315c, and 315d, an image processor 330, an encoder 335, and a decoder 340. The signals from imaging devices 315a, 315b, 315c, and 315d represent four views of the near-end user 305 that are processed by the image processor 330. The imaging devices 315a, 315b, 315c, and 315d may each be capable of generating a full-resolution image, or they may be devices of lesser capability the outputs from which, when taken together, a higher resolution image may be synthesized. The resulting image information is encoded by the encoder 335 for transmission via the network 350. The decoder 340 decodes the image data that is received from the far-end party via the network 350 and passes it to the image processor 330 for processing and display on the visual display device 310. It should be noted that although FIG. 3A shows four imaging devices located about the perimeter of visual display device 310, a greater or lesser number of imaging devices may be used, and their position and arrangement may be altered from that illustrated including location within the active image area of visual display device 310, without departing from the spirit of the present invention.

Figure 3C:
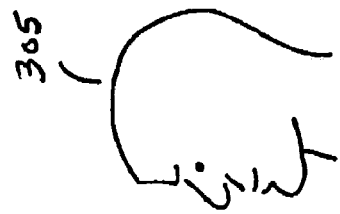
FIG. 3C is a block diagram showing a left-side view of the exemplary two-way visual communication system of FIG. 3A, in accordance with an embodiment of the present invention.
Figure 3C:
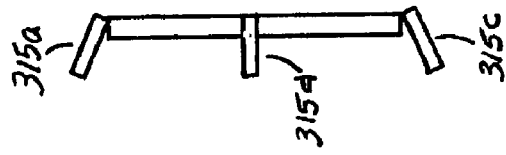
Figure 3B:
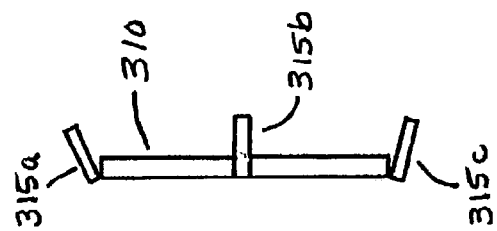
FIG. 3B is a block diagram showing a right-side view of the exemplary two-way visual communication system of FIG. 3A, in accordance with an embodiment of the present invention.
Figure 3B:

In the exemplary embodiment of FIG. 3A, the output of each of the imaging devices 315a, 315b, 315c, and 315d may be analyzed by image processor 330 to determine the position within each image of the face and the orientation of the head of a near-end user, shown as near-end user 305 in the right-side view of FIG. 3B and the left-side view of FIG. 3C. It may also calculate an estimate of position of the eyes within the image from each imaging device 315a, 315b, 315c, or 315d. Visible characteristics of the sub-image containing the eyes of near-end user 305, for example, the ratio of the areas of the exposed sclera between the inner edge of the iris and the inner corner of the eye, the contour of the iris as exposed by the upper and lower eyelids, and the position of the lower edge of the upper eye lid and of the iris relative to nearby fixed facial features may be used to derive an estimate of the direction of gaze of the eyes of near-end user 305.

An estimate of the level of eye contact perceived by a viewer may be made for the images output by each of the imaging devices 315a, 315b, 315c, and 315d using, for example, the facial normal. By determining the distance from the point of intersection of the facial normal with the plane in which imaging devices 315a, 315b, 315c, and 315d lie, to each of the imaging devices 315a, 315b, 315c, and 315d, an estimate of eye contact can be generated. Algorithms known to those in the art make it possible to recognize facial features within an image without any specific information at the near-end regarding the facial features of the far-end party, other than the assumption that a human face may be present. An example of an approach to the localization of facial feature is documented in Feris, et al, above. The image processor 330 may analyze the image of the far-end party received by two-way visual communication system 300 in order to calculate an approximate location of the facial image of the far-end party on the screen of the visual display device 310. It may also calculate an estimate within that image of the approximate position of the eyes of the far-end party. Algorithms to estimate the direction of gaze of the near-end user 305 are also known to those in the art. An example may be found in the work of A. H. Gee and R. Cipolla, "Determining the Gaze of Faces in Images", University of Cambridge, Department of Engineering, CUED/F-INFENG/TR-174, March, 1994. The location of the eyes of the far-end party on the screen of visual display device 310 may be compared with the direction of gaze of the near-end user 305 as derived from the images output by the imaging devices 315a, 315b, 315c, and 315d to identify which of the imaging devices 315a, 315b, 315c, and 315d is nearest the point of visual focus of near-end user 305. The output of the identified imaging device may then be selected for transmission to the far-end party. This information may also be used to modify the image before transmission in order to further enhance the perception of eye contact by the far-end party. This modification may include, for example, adjusting the appearance of the sub-image containing the eyes of the near-end user 305. In this manner, the displacement between the direction of gaze of the near-end-user 305 and the point of view of the image sent to the far-end party is minimized. This selection operates to maximize the level of eye contact as perceived by the far-end party.

In a further embodiment in accordance with the present invention, the image processor 330 may compare one of a number of predetermined thresholds to the difference between the direction of gaze of near-end user 305 and a predetermined point on the screen of visual display device 310 such as, for example, the locations of imaging devices 315a, 315b, 315c, and 315d. It may then incorporate the results of those comparisons in the decision of which imaging device output to transmit, and whether or not to change from one of the imaging devices 315a, 315b, 315c, and 315d, to another. The use of such thresholds may avoid making changes in the point of view that may annoy the far-end user. This approach may also help to avoid modifying the output of the imaging device when the direction of gaze is not directed toward the visual display device. Attempting to modify the image in situations when the eyes are focused too far away from the center of the viewing area of the visual display device may result in abnormal distortion of the facial image, distracting the far-end party. For example, if the orientation of the head and direction of gaze indicate a point of focus greater than a certain angular displacement from the center of the visual display device, an embodiment of the preset invention may send the unmodified image output of the imaging device to the far-end party. In another embodiment in accordance with the present invention, the user 305 may be permitted to manually disable the image modification function and/or to select the output from a particular imaging device, in order to achieve a particular result.

In yet another embodiment in accordance with the present invention, the image processor 330 may be used to synthesize a new image for encoding and transmission via network 350 using the image outputs from imaging devices 315a, 315b, 315c, and 315d. The algorithms to combine the outputs from multiple imaging devices to allow panoramic viewing are well known in the art, and have been used in commercial entertainment film production for several years. Due to the smaller size of the viewing screen of the users of two-way visual communication system 300, the computational capabilities of these techniques may be simplified for use in this application. In addition, the synthesis of a combined output image by image processor 330 may use information derived from the images captured during a system training activity like that described above to produce a more pleasing image. The combining of the outputs of imaging devices 315a, 315b, 315c, and 315d may include, for example, the merging of individual images and the further modification of specific details of the synthesized image, for example, the sub-image containing the eyes. Closed-loop system optimization by the user 305 may be used to fine tune the image synthesis process and to provide additional enhancement of the level of eye contact perceived by the far-end party. In an embodiment in accordance with the present invention, the user 305 may also choose to disable image synthesis, or to use the output from a subset of imaging devices 315a, 315b, 315c, and 315d in the image synthesis process.

In a further embodiment in accordance with the present invention, imaging devices 315a, 315b, 315c, and 315d may comprise imaging devices operating at a resolution lower than that typically used for this application, and below that of the receiving visual display device 310 of the far-end party. In addition, imaging devices 315a, 315b, 315c, and 315d may have fewer picture element, or pixels, than those typically used. Image processor 330 may be used to combine the images from imaging devices 315a, 315b, 315c, and 315d, in the manner described above, and in addition, apply image enhancement which results in an effective image resolution higher than that of the imaging devices themselves. Algorithms capable of performing resolution enhancement are well known in the art, and are in use in commercial digital imaging devices. Use of these techniques may permit the imaging devices 315a, 315b, 315c, and 315d to be of a simpler nature, smaller in size, lower in cost, and to be located within the enclosure or even the active area of the visual display device 310. An embodiment of the present invention permits the use of an array of small imaging devices placed closer to the viewing area of visual display device 310, resulting in a higher perceived level of eye contact for the far-end party.

Figure 4:
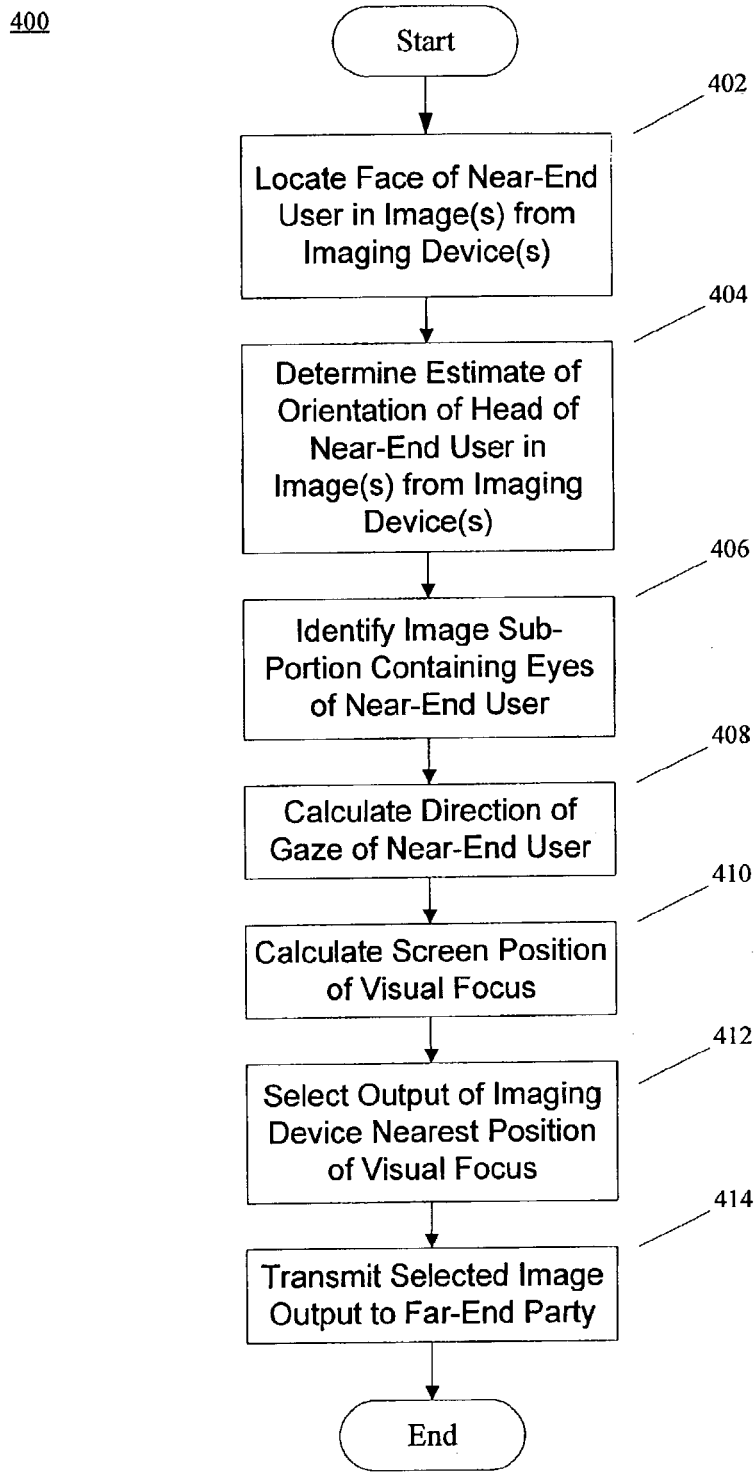
FIG. 4 is a flow chart illustrating an exemplary method that may be used to implement a two-way visual communication system, in accordance with the present invention.

FIG. 4 is a flow chart illustrating an exemplary method that may be used to implement a two-way visual communication system such as that shown in FIG. 3A, in accordance with the present invention. The process illustrated in FIG. 4 begins by analyzing the images from multiple imaging devices, such as imaging devices 315a, 315b, 315c, and 315d of FIG. 3A, and locating the face of the near-end user in each of those images (block 402). Next, an estimate of the orientation of the head of the near-end user is determined (block 404). The images are then analyzed to determine the sub-image containing the eyes of the near-end user (block 406), and the direction of gaze (block 408). Using the information from these calculations, the screen position of the visual focus may be estimated (block 410), and the output of the imaging device nearest the screen position estimate may be selected (block 412). The selected output is then transmitted to the far-end party (block 414).

Figure 5:
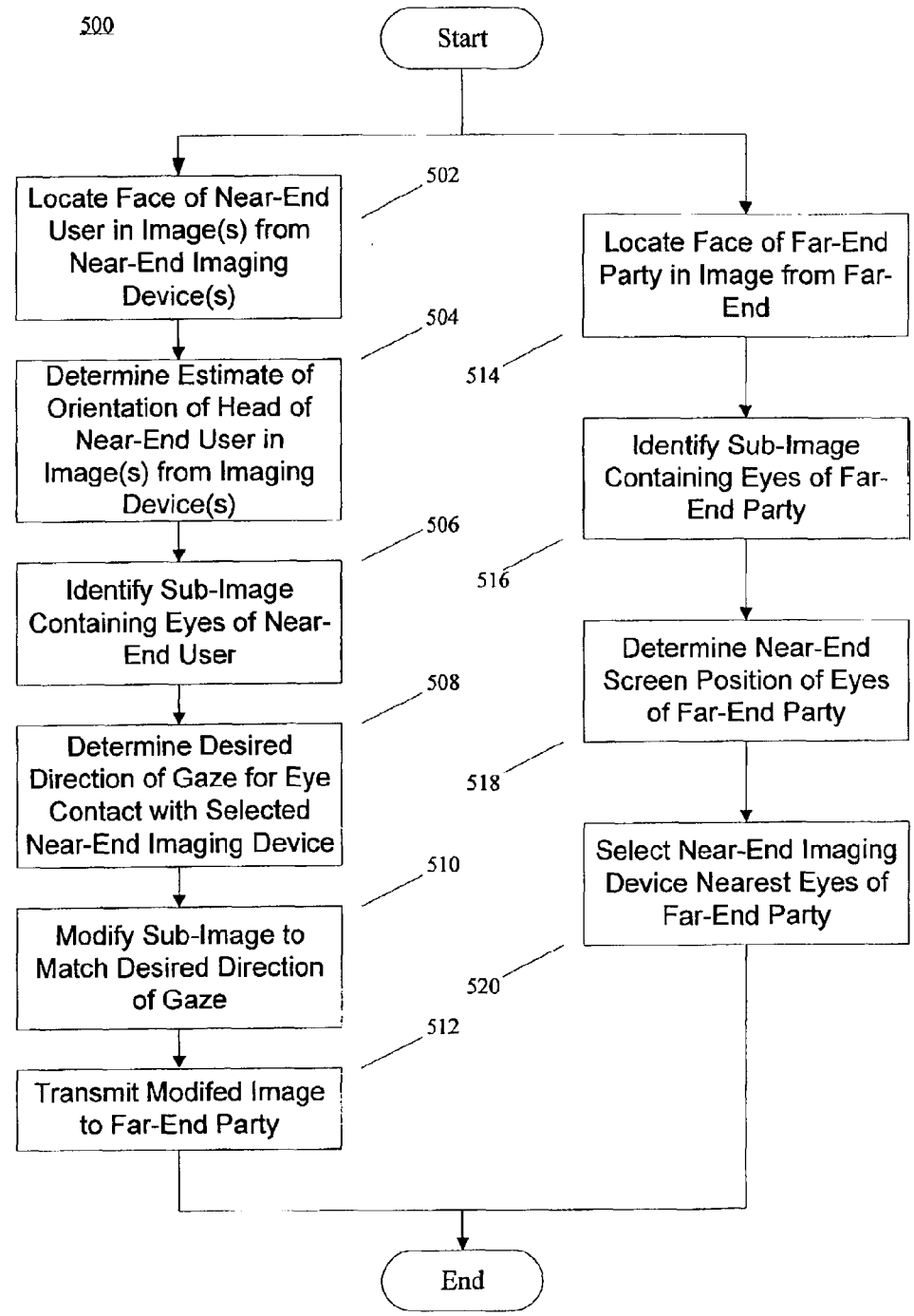
FIG. 5 is a flow chart illustrating another exemplary method that may be used to implement a two-way visual communication system, in accordance with the present invention.

FIG. 5 is a flow chart illustrating another exemplary method that may be used to implement a two-way visual communication system, in accordance with the present invention. The method illustrated in FIG. 5 is shown as separate paths in order to represent that the actions illustrated in the two paths may occur in parallel. The right side of the illustration of FIG. 5 begins by analyzing the image received from the far-end in order to locate the face of the far-end party (block 514). The sub-image containing the eyes of the far-end party is then identified (block 516). Next, an estimate of the position on the near-end display of the eyes of the far-end party is determined (block 518). The estimate is then used to select the near-end imaging device closest to the image on the near-end visual display of the eyes of the far-end party (block 520).

The left side of the illustration of FIG. 5 starts by analyzing the images from multiple near-end imaging devices, such as imaging devices 315a, 315b, 315c, and 315d of FIG. 3A, and locating the face of the near-end user in each of those images (block 502). An estimate of the orientation of the head of the near-end user is then determined (block 504). The images from the imaging devices are then analyzed to identify the sub-image containing the eyes of the near-end user in the image from the imaging device selected in block 520 (block 506). The method then calculates the direction of gaze needed for the visual focus of the near-end user to be located coincident with the imaging device selected at block 520 (block 508). The sub-image containing the eyes of the near-end party of the image from the imaging device selected at block 520 is then modified to more closely approximate the calculated direction of gaze (block 510). The resulting modified image is then transmitted to the far-end party (block 512).

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A two-way visual communication system comprising:
a visual display device for displaying, at a first location, an image represented by a first signal received from a remote second location;
an imaging device having a field of view directed at a user of the visual display device, the imaging device producing a second signal for transmission to the remote second location, the second signal representing an image of the user;
at least one image processor, at the first location, enabling analysis of the first signal to determine a location of a facial feature in the image represented by the first signal, and enabling modification of the second signal based upon the determined location of the facial feature in the image represented by the first signal, wherein the at least one image processor encodes the modified second signal at the first location for transmission to the remote second location; and
wherein the modification of the second signal based upon the determined location of the facial feature in the image represented by the first signal comprises a closed loop optimization of the modification at the first location.

2. The two-way visual communication system of claim 1 wherein the modification comprises altering the second signal in order to change an apparent viewpoint of the imaging device.

3. The two-way visual communication system of claim 1 wherein the first signal is altered so as to align a feature of the displayed image in specific relation to an apparent viewpoint of the imaging device.

4. The two-way visual communication system of claim 1 wherein the modification comprises altering the second signal by adjusting at least one of the following: exposure of an iris of an eye and exposure of the sclera of an eye, in order to increase the perception of eye contact by a viewer of the image represented by the second signal.

5. The two-way visual communication system of claim 1 further comprising an interface for communicating via network.

6. The two-way visual communication system of claim 5 wherein the network is at least one of the following: a packet network and a wireless network.

7. A two-way visual communication system comprising:
- a visual display device for displaying, at a first location, an image represented by a first signal received from a remote second location;
- at least two imaging devices in spaced relation to one another, the at least two imaging devices being arranged so that the fields of view of the at least two imaging devices are directed at a user of the visual display device, each of the at least two imaging devices producing an output signal representative of an image, the output signals collectively forming a plurality of output signals;
- at least one image processor, at the first location, enabling analysis of the first signal to determine a location of a facial feature in the image represented by the first signal, and enabling processing of the plurality of output signals based upon the determined location of the facial feature in the image represented by the first signal, the at least one image processor producing, from the plurality of output signals for transmission to the remote second location, a second signal representative of an image of the user, wherein the at least one image processor encodes the second signal at the first location for transmission to the remote second location; and
- wherein producing, from the plurality of output signals for transmission to the remote second location, the second signal representative of the image of the user comprises performing a closed loop optimization at the first location.

8. The two-way visual communication system of claim 7 further comprising an interface for communicating via network.

9. The two-way communication system of claim 8 wherein the network is one of at least the following: a packet network and a wireless network.

10. The two-way visual communication system of claim 7 wherein the second signal represents an image synthesized using at least two of the plurality of output signals.

11. The two-way visual communication system of claim 10 wherein the resolution of the image represented by the second signal is greater than the resolution of the image represented by anyone of the plurality of output signals.

12. The two-way visual communication system of claim 10 wherein the number of picture elements in the image represented by the second signal is greater than the number of picture elements in the image represented by any one of the plurality of output signals.

13. The two-way visual communication system of claim 7 wherein the level of eye contact with a user as perceived by a viewer of the image represented by the second signal is improved relative to the level of eye contact perceived by a viewer of the image represented by any one of the plurality of output signals.

14. The two-way visual communication system of claim 7 wherein the first signal is altered in order to position a portion of the image represented by the first signal in specific relation to at least one of the at least two imaging devices.

15. The two-way visual communication system of claim 7 wherein the at least one image processor selects at least one of the plurality of output signals based upon the proximity of the corresponding imaging device to at least one portion of the image represented by the first signal.

16. A method of operating a two-way visual communication system comprising: receiving, at a first location from a remote second location, a first signal representing a first image; processing, at the first location, the first signal to determine a location of a facial feature in the first image; converting, at the first location, a second image to a second signal;
- modifying the second signal based upon the determined location of the facial feature in the first image; and
- encoding the modified second signal at the first location for transmission to the remote second location, and
- performing a closed optimization of the modification of the second signal at the first location.

17. The method of claim 16 further comprising transmitting the second signal via a network.

18. The method of claim 17 wherein the network is at least one of the following: a packet network and a wireless network.

19. A method of operating a two-way visual communication system comprising: receiving, at a first location from a remote second location, a first signal representing a first image of a user at the remote second location; processing, at the first location, the first signal to determine a location of a facial feature in the first image;
- converting a plurality of images of a user at the first location into a plurality of output signals;
- generating a second signal representing an image of the user at the first location based upon the plurality of output signals and the determined location of the facial feature in the first image;
- encoding the second signal at the first location for transmission to the remote second location, and
- performing a closed loop optimization of the modification of the second signal at the first location.

20. The method of claim 19 wherein the at least one characteristic of the plurality of output images is at least one of the following: the direction of gaze and the orientation of the head of a person.

21. The method of claim 19 wherein the processing alters the first signal based upon the at least one characteristic of the first image, and the method further comprises displaying the altered first signal.

22. The method of claim 19 further comprising transmitting the second signal via a network.

23. The method of claim 22 wherein the network is at least one of the following: packet network and wireless network.

24. A machine-readable storage, having stored thereon a computer program having at least one code section for implementing a two-way visual communication system, the at least one code section executable by a machine for causing the machine to perform the operations comprising:
- receiving, at a first location from a remote second location, a first signal representing a first image;
- processing, at the first location, the first signal to determine a location of a facial feature in the first image;
- converting, at the first location, a second image to a second signal;
- modifying the second signal based upon the determined location of the facial feature in the first image;
- encoding the modified second signal at the first location for transmission to the remote second location, and wherein the at least one code section is executable by the machine to cause the machine to perform a closed loop optimization of the modification of the second signal at the first location.

25. The machine-readable storage of claim 24 further comprising transmitting the second signal via network.

26. The machine-readable storage of claim 25 wherein the network is at least one of the following: a packet network and a wireless network.

27. A machine-readable storage, having stored thereon a computer program having at least one code section for implementing a two-way visual communication system, the at least one code section executable by a machine for causing the machine to perform the operations comprising:

receiving, at a first location from a remote second location, a first signal representing a first image of a user at the remote second location;

processing, at the first location, the first signal to determine a location of a facial feature in the first image;

converting a plurality of images of a user at the first location into a plurality of output signals;

generating a second signal representing an image of the user at the first location based upon the plurality of output signals and the determined location of the facial feature in the first image;

encoding the second signal at the first location for transmission to the remote second location, and wherein the at least one code section is executable by the machine to cause the machine to perform a closed loop optimization of the modification of the second signal at the first location.

28. The machine-readable storage of claim 27 wherein the at least one characteristic of the plurality of output images is at least one of the following: the direction of gaze and the orientation of the head of a person.

29. The machine-readable storage of claim 27 wherein the processing alters the first signal based upon the at least one characteristic of the first image, and the method further comprises displaying the altered first signal.

30. The machine-readable storage of claim 27 further comprising transmitting the second signal via a network.

31. The machine-readable storage of claim 30 wherein the network is at least one of the following: a packet network and a wireless network.

* * * * *